United States Patent [19]

Nakajima

[11] Patent Number: 4,980,247
[45] Date of Patent: Dec. 25, 1990

[54] APPARATUS FOR SUPPLEMENTING ELECTROLYTE TO MATRIX-TYPE FUEL CELL

[75] Inventor: Noriyuki Nakajima, Kanagawa, Japan

[73] Assignee: Fuji Electric Co., Ltd., Kanagawa, Japan

[21] Appl. No.: 536,941

[22] Filed: Jun. 7, 1990

Related U.S. Application Data

[63] Continuation of Ser. No. 341,173, Apr. 21, 1989, abandoned.

[30] Foreign Application Priority Data

Apr. 25, 1988 [JP] Japan .................. 63-102253

[51] Int. Cl.⁵ ............................. H01M 8/04
[52] U.S. Cl. ........................ 429/34; 429/38
[58] Field of Search ................... 429/34, 38, 39

[56] References Cited

U.S. PATENT DOCUMENTS 4,463,066 7/1984 Adlhart et al. .................. 429/34
4,463,067 7/1984 Feigenbaum ..................... 429/34
4,463,068 7/1984 Cohn et al. ..................... 429/34

Primary Examiner—Donald L. Walton
Attorney, Agent, or Firm—Finnegan, Henderson, Farabow, Garrett, and Dunner

[57] ABSTRACT

An apparatus for externally supplementing an electrolyte into a matrix-type fuel cell constituted by a cell lamination composed of laminated cells each having a matrix impregnated with and holding an electrolyte, comprising an electrolyte source for sending the electrolyte under pressure, a header vertically provided along a side surface of the cell lamination for passing the pressurized electrolyte through the header from the electrolyte source, and supply pipes connected to the cells from the header for supplying the electrolyte to the matrices of the cells. The flow resistance in each of the supply pipes is selected to be greater than the flow resistance in the header.

4 Claims, 2 Drawing Sheets

APPARATUS FOR SUPPLEMENTING ELECTROLYTE TO MATRIX-TYPE FUEL CELL

This application is a continuation of application Ser. No. 341,173, filed Apr. 21, 1989 now abandoned.

BACKGROUND OF THE INVENTION

1. Field of the Invention

The present invention relates to an electrolyte supplementing apparatus for supplementing an electrolyte to matrices of cells constituting a cell lamination of a matrix-type fuel cell.

2. Description of the Prior Art

In a conventional matrix-type fuel cell, e.g., a phosphoric acid fuel cell, as shown in FIG. 2, a cell lamination 10 is formed from a plurality of cells 1 laminated one on one. Each cell 1 comprises a porous matrix 3 impregnated with an electrolyte of phosphoric acid, a fuel electrode 4a, and an oxidizing agent electrode 6a. The fuel electrode 4a comprises a fuel electrode catalyst layer 4 in contact with one surface of the matrix 3 and a gas-permeable electrode substrate 5 supporting the fuel electrode catalyst layer 4 thereon and having grooves 5a formed therein so as to act as fuel gas flowing paths. The oxidizing agent electrode 6a comprises an oxidizing agent electrode catalyst layer 6 in contact with the other surface of the matrix 3 and a gas-permeable electrode substrate 7 supporting the oxidizing agent electrode catalyst layer 6 thereon and having grooves 7a formed therein so as to act as an oxidizing agent gas flow path. Gas impermeable separators 8 are interposed between adjacent cells 1.

The fuel gas and the oxidizing agent gas are supplied as reactive gases into the cell lamination 10 to operate the fuel cells. Electrochemical reaction in each of the cells 1 produces electricity. The reaction heat generated is removed by means of a cooling medium to maintain the operation temperature.

Since the phosphoric acid contained in the matrix 3 diminishes gradually as the operation of the fuel cell progresses, the internal resistance increases as time elapses while the respective reactive gases to be supplied to the electrodes opposite to each other pass through the matrix 3 and mix with each other to generate a combustion reaction directly inside each of the cells 1. This results in damage to the electrodes with a reduction in performance or ceasing of operation of the fuel cell. In order to solve the problem, an apparatus for externally supplementing an electrolyte of phosphoric acid into the matrix 3 of a fuel cell 1 has been provided so that the phosphoric acid is continuously or periodically supplemented to the matrix 3. The present inventor has proposed an apparatus for supplementing an electrolyte to a matrix-type fuel cell in Japanese Patent Application No. 59-228228 (Japanese Patent Unexamined Publication No. 61-107667). This proposed apparatus has a structure as shown on the right side of FIG. 2.

In FIG. 2, the proposed electrolyte supplementing apparatus 11 comprises a tank assembly 13 collectively having storage tanks 12 and electrolyte supplementing conduits 14 provided between the respective storage tanks 12 and the corresponding fuel electrode supporting substrates 5 of the cells 1 of the cell lamination 10 supplement an electrolyte to the respective matrices 3 of the cells 1 through respective electrolyte supplementing channels 18 filled with a hydrophilic filler, e.g., carbon fibers. The tank assembly 13 of FIG. 2 is comprised of storage tanks 12 stacked in a plurality of layers each having two storage tanks arranged side by side. Phosphoric acid is supplied from an upper side electrolyte supply portion 15 into the storage tanks 12 for storage. The phosphoric acid supplied from the electrolyte supply portion 15 flows into the two storage tanks 12 of the uppermost layer through opening portions 16a of a partition plate 16 of the uppermost layer. When the two storage tanks 12 in the uppermost layer have been filled with the phosphoric acid to the level of a discharge portion 17 provided between the two storage tanks 12 in the uppermost layer, the phosphoric acid overflows from the discharge portion 17 of the two storage tanks 12 in the uppermost layer. The phosphoric acid then flows into the two storage tanks 12 in the next or second layer through the opening portions 16a of the partition plate 16 of the second layer, so that the storage tanks 12 in the second layer are filled with phosphoric acid. The same applies to the storage tanks 12 in all the layers of the tank assembly 13.

Each of the electrolyte supplementing ducts 14 is filled with a filler 14a of a hydrophilic material, e.g., carbon fibers, so that the phosphoric acid stored in each of the storage tank 12 is drawn by the filler 14a of the corresponding electrolyte supplementing duct 14 to flow therethrough and supplemented to the matrix 3 of the corresponding cell 1 through the electrolyte channel 18. Therefore, when the phosphoric acid is to be supplemented to the matrices 3 after operation of the fuel cell for a predetermined number of hours, the phosphoric acid is supplied from the electrolyte supply portion 15 so that all the storage tanks 12 are filled with the phosphoric acid. The stored phosphoric acid is supplemented to all the matrices 3 of the respective cells 1 through the corresponding electrolyte supplementing ducts 14.

The supplement of an electrolyte by means of the electrolyte supplementing apparatus into the matrices of the respective laminated cells 1 of the cell lamination as described above is carried out by a capillary action of the hydrophilic fillers in the respective electrolyte supplementing ducts 14 as well as by a head difference between the storage tanks 12 and the corresponding electrolyte supplementing channels 18. Accordingly, there have been problems in that the speed of displacement of the electrolyte is so low that it takes many hours to complete supplementing the matrices. Additionally, the quantity of electrolyte to be supplemented at a given time is fixed and limited by the capacity of each storage tank.

SUMMARY OF THE INVENTION

The present invention overcomes the problems and disadvantages of the prior art by providing a novel electrolyte supplementing apparatus in which an electrolyte can be supplemented in any quantity in a relatively short period of time into matrices of cells constituting a cell lamination of a matrix-type fuel cell.

It is therefore an object of the present invention to solve the above problems in the prior art.

It is another object of the present invention to provide an electrolyte supplementing apparatus in which an electrolyte can be supplemented by any desired quantity in a relatively short period of time into matrices of cells constituting a cell lamination of a matrix-type fuel cell.

Additional objects and advantages of the present invention will be set forth, in part, in the description which follows and, in part, will be obvious from the description or may be learned by practice of the invention. The objects and advantages of the invention may be learned by and attained by means of the instrumentalities and combination of steps particularly pointed out in the appended claims.

In order to attain the above objects and in accordance with the purpose of the present invention, as embodied and broadly described herein, the apparatus of the present invention for externally supplementing an electrolyte into a matrix-type fuel cell constituted by a cell lamination composed of laminated cells each having a matrix impregnated with and holding an electrolyte, comprises an electrolyte source for sending the electrolyte under pressure, a header vertically provided along a side surface of the cell lamination for passing the pressurized electrolyte through said header from the electrolyte source, and supply pipes connected to the cells from the header for supplying pipes connected to the matrices of the cells, wherein the resistance to flow of the electrolyte in each of the supply pipes is selected to be greater than the resistance to flow of the electrolyte in the header.

The pressurized electrolyte supplied from the electrolyte source passes through the header and the supply pipes so as to be supplemented to the respective matrices of the cells constituting the cell lamination. The electrolyte can be pressurized so as to be supplemented because the resistance to flow of the electrolyte in each of the supply pipes is selected to be larger than the resistance to flow of the electrolyte in the header. Therefore, the electrolyte can be rapidly supplemented to the cells in amounts required by the cells. The head difference between the respective cells due to the difference in level of the respective cells is nominal and may be discounted because the electrolyte is pressurized. Accordingly, the quantity of electrolyte supplement can be determined by the amount of pressure and the amount of time.

The accompanying drawings, which are incorporated in and constitute a part of this specification, illustrate an embodiment of the invention and, together with the description serve to explain the principles of the invention.

BRIEF DESCRIPTION OF THE DRAWINGS

The present invention will be more apparent from the following description taken in connection with the accompanying drawings, wherein.

DETAILED DESCRIPTION OF THE PREFERRED EMBODIMENT

Figure 1:
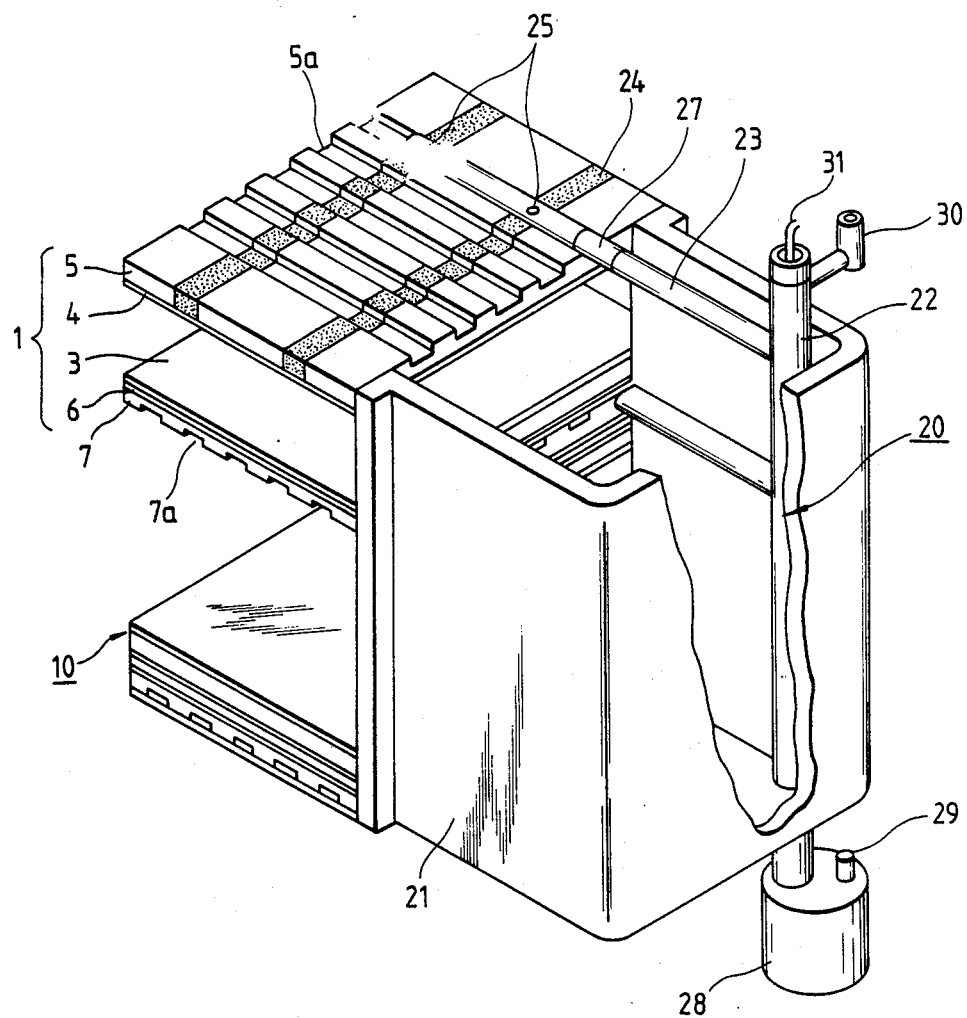
FIG. 1 is a partial, perspective view showing a matrix-type fuel cell having the electrolyte supplementing apparatus according to an embodiment of the present invention.
Figure 2:
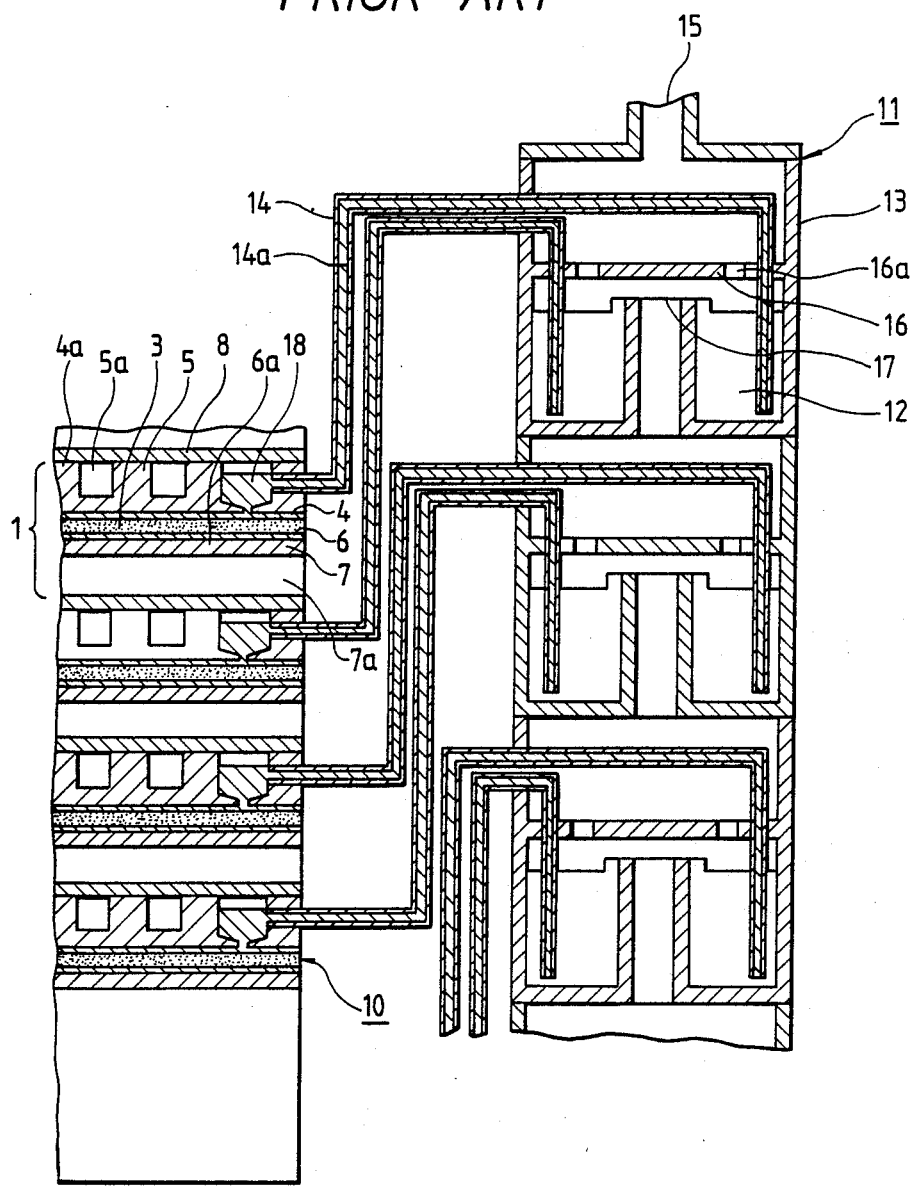
FIG. 2 is a partial, sectional view showing a matrix-type fuel cells having a conventional electrolyte supplementing apparatus.

Reference will now be made in detail to the present preferred embodiment of the present invention, an example of which is illustrated in the accompanying drawings. Whenever possible, the same reference numbers will be used throughout the drawings to refer to the same or like parts. In FIG. 1, items corresponding to those of the conventional example of FIG. 2 are correspondingly referenced, and the explanation thereof is omitted. In FIG. 1, the electrolyte supplementing apparatus 20 according to the present invention comprises a tubular header 22 provided vertically along a side surface of a cell lamination 10 and through a manifold 21 for supplying reactive gases to cells 1 constituting the cell lamination 10. Supply pipes 23 connect the header 22 and the respective cells 1 constituting the cell lamination 10. The ends of the supply pipes 23 at the cells 1 are closed. Hydrophilic treatment portions 24 for storing the electrolyte are provided in a fuel electrode supporting substrate 5 of each of the cells 1. For fuel gas channels, grooves are formed to cross the hydrophilic treatment portions 24 in the fuel electrode supporting substrate 5. The end portions of each of the supply pipes 23 at the cells 1 are inserted into corresponding grooves 5a so that holes 25 formed in the pipe end face the hydrophilic treatment portions 24. The electrolyte stored in the hydrophilic treatment portions 24 is supplemented into a matrix 3 of the cell 1 through pores piercing a fuel electrode catalyst layer 4 of the cell 1.

A restriction 27 is provided in each of the supply pipes 23 between the holes 25 and the header 22 so that the resistance to flow of the electrolyte flowing in the supply pipe 23 is made larger than the flow resistance to the electrolyte flowing in the header 22. The equivalent diameter of the throttle hole of the restriction 27 is selected to be one over several tenths of the diameter of the fluid passageway of the header 22.

A sealed electrolyte tank 28 is provided on a lower end portion of the header 22 as an electolyte source. The lower end portion of the header 22 is inserted into the electrolyte tank 28, and a pressure port 29 is provided in an upper plate of the electrolyte tank 28 so that a gas to be used for pressurizing the electrolyte stored in the electrolyte tank 28 may be supplied into the electrolyte tank 28 through the pressure port 29.

An electromagnetic valve 30 and a liquid surface sensor 31 for detecting the upper limit of the liquid level of the electrolyte flowing in the header 22 are attached on the upper end portion of the header 22. The electromagnetic valve 30 is opened and closed by a detection signal generated by the liquid surface sensor 31.

A description will be made as to a method of how to supplement an electrolyte into the matrices of a fuel cell by means of the electrolyte supplementing apparatus of the present invention. First, the electrolyte tank 28 is filled with an electrolyte. The electromagnetic valve 30 is opened so that gas pressure is exerted onto the electrolyte in the electrolyte tank 28 from the pressure port 29 so as to cause the electrolyte to rise through the header 22. When the liquid level of the electrolyte in the header 22 is detected by the liquid surface sensor 31, electromagnetic valve 30 is closed. In this state, gas pressure is further exerted onto the electrolyte by application of gas pressure so that the electrolyte is caused to flow from the header 22 into the supply pipes 23. The pressure of the pressurized electrolyte is reduced through the restrictions 27 provided in the respective supply pipes 23 and then the electrolyte thus reduced in pressure is supplied through the hydrophilic treatment portions 24 to the matrices 3 of the respective cells 1 constituting the cell lamination 10. Accordingly, supplementation may take only minutes to complete.

Since the head difference due to differences in height of the laminated cells 1 is nominal and may be disregarded due to the exertion of pressure onto the electrolyte, the quantity of electrolyte to be supplemented to the respective cells 1 can be readily controlled by controlling the time duration of pressure exertion and the degree of the pressure.

Upon completion of electrolyte supplementation, the gas pressure exerted onto the electrolyte in the electrolyte 28 is made equal to the gas pressure in the manifold 21, and the electromagnetic valve 30 is opened. As a result, the electrolyte in the header 22 and supply pipes 23 is returned to the electrolyte tank 28 to thereby complete the electrolyte supplementing operation.

Although the above embodiment has been illustrated as to the case where the restrictions are provided in the respective supply pipes to make the resistance to flow of the electrolyte in the supply pipes larger than that in the header, the same effects as above can be obtained in the case where the supply pipes are reduced in their diameter, for example, the supply pipes are reduced in their diameter so as to be about 1 mm when the diameter of the header is selected to be about 10 mm, to thereby make the flow resistance exerted onto the electrolyte in the supply pipes larger than that exerted onto the electrolyte in the header.

As apparent from the foregoing description, according to the present invention, the supplement of an electrolyte into cells constituting a cell lamination of a fuel cell is preformed through supply pipes connected to a header. The supply pipes are made to have flow resistance exerted on the electrolyte flowing therethrough which is selected to be larger than that exerted onto the electrolyte flowing in header. Accordingly, the pressured electrolyte sent into the header can be supplemented into the cells through the supply pipes. Accordingly, the present invention has meritorious effects in that the time taken for the supplement can be reduced and the quantity of supplement of electrolyte can be desirably controlled by controlling the degree of pressure to be exerted on the electrolyte and the time of the pressure exertion.

It will be apparent to those skilled in the art that various modifications and variations can be made in the electrolyte supplementing apparatus of the present invention without departing from the scope or spirit of the present invention. Thus, it is intended that the present invention cover the modifications and variations of this invention provided they come within the scope of the appended claim and their equivalents.

What is claimed is:

1. An apparatus for externally supplementing an electrolyte into a matrix-type fuel cell constituted by a cell lamination composed of laminated cells each having a matrix impregnated with and holding an electrolyte, said apparatus comprising:

an electrolyte source;

a header vertically provided along a side surface of said cell lamination and connected to the electrolyte source for passing the pressurized electrolyte through said header from said electrolyte source;

supply pipes connected to said cells from said header, the resistance to flow of said electrolyte in each of said supply pipes being selected to be greater than the resistance to flow of said electrolyte in said header; and a pressure port operatively associated with said electrolyte source for sending said electrolyte from said electrolyte source through said header and supply pipes to said cells solely under the pressure exerted through said pressure port.

2. An apparatus as claimed in claim 1, further comprising an electromagnetic valve and a liquid surface sensor provided on the upper end of said header.

3. An apparatus as claimed in claim 1, wherein said resistance to flow of the electrolyte in each of said supply pipes is effected by resistances within said supply pipes.

4. An apparatus as claimed in claim 3, wherein the diameter of each of said resistances in said supply pipes is at least several tenths of the diameter of the fluid passageway of said header.

* * * * *